(12) United States Patent
Corrigan

(10) Patent No.: US 6,772,289 B1
(45) Date of Patent: Aug. 3, 2004

(54) METHODS AND APPARATUS FOR MANAGING CACHED CRC VALUES IN A STORAGE CONTROLLER

(75) Inventor: Brian E. Corrigan, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 326 days.

(21) Appl. No.: 10/057,863

(22) Filed: Jan. 24, 2002

Related U.S. Application Data (63) Continuation-in-part of application No. 10/022,051, filed on Dec. 17, 2001.

(51) Int. Cl.[7] .................................. G06F 12/00
(52) U.S. Cl. .................... 711/118; 711/100; 711/112; 711/113; 711/117; 711/119; 714/6; 714/52; 714/757; 714/764
(58) Field of Search ................ 711/118, 100, 711/112, 113, 117, 119; 714/6, 52, 757, 764

(56) References Cited

U.S. PATENT DOCUMENTS

| | | | |
|---|---|---|---|
| 5,355,522 A | | 10/1994 | Demange |
| 5,719,885 A | | 2/1998 | Ofer et al. |
| 5,734,815 A | * | 3/1998 | Schatzberg ............ 714/6 |
| 6,061,822 A | | 5/2000 | Meyer |
| 6,185,207 B1 | | 2/2001 | LaBerge et al. |
| 6,304,992 B1 | * | 10/2001 | Cypher ................ 714/757 |
| 6,516,386 B1 | * | 2/2003 | Pang et al. ............ 711/118 |
| 6,519,733 B1 | | 2/2003 | Har et al. |
| 6,539,503 B1 | * | 3/2003 | Walker ............... 714/703 |
| 6,553,511 B1 | | 4/2003 | DeKoning et al. |
| 6,629,288 B1 | | 9/2003 | Bernath et al. |
| 2003/0093751 A1 | | 5/2003 | Hohl |
| 2003/0115417 A1 | | 6/2003 | Corrigan |

OTHER PUBLICATIONS

Error Detection & Correction Options for Data Services in B–ISDN—Author(s)—Damodaram et al.
Fast CRC Calculation—Author(s)—Glaise et al.

* cited by examiner

*Primary Examiner*—Donald Sparks
*Assistant Examiner*—Ngoc Dinh
(74) *Attorney, Agent, or Firm*—Lathrop & Gage

(57) ABSTRACT

A CRC value cache architecture and methods of operation of same to reduce overhead processing associated with managing a CRC value cache memory. The invention first provides for transferring from system memory to CRC value cache memory all CRC values for all sub-blocks of a data block in response to access to a first CRC value for a first sub-block. This reduces overhead processing to arbitrate for control of the system memory for each CRC value for each sub-block of a block. The invention additionally provides that a separate cache table is maintained corresponding to each device within the storage controller that requests CRC values. Each of the multiple cache entry tables is therefore shorter and more rapidly searched as compared to prior techniques thereby further reducing overhead processing to manage the cached CRC values.

21 Claims, 6 Drawing Sheets

METHODS AND APPARATUS FOR MANAGING CACHED CRC VALUES IN A STORAGE CONTROLLER

RELATED PATENTS

This patent is a continuation in part patent application of, and claiming priority under 35 U.S.C. §120 to, U.S. patent Ser. No. 10/022,051 filed on Dec. 17, 2001 and entitled Method and Apparatus for Protection of Data Utilizing CRC (hereinafter referred to as the "parent" patent application and hereby incorporated by reference).

BACKGROUND OF THE INVENTION

1. Field of the Invention

The present invention is directed generally toward a method and apparatus for protection of data utilizing cyclical redundancy checking.

2. Discussion of Related Art

In a high-performance computer system consisting of multiple processors and mass storage devices, it is of critical importance that all information be stored and retrieved reliably with no errors. It is of equal importance that if errors occur in the storage or retrieval of data, that the errors be detected and reported. Typically, the mass storage of a high-performance computer system consists of a redundant array of independent disks (RAID). Within the RAID mass storage system, data is stored both in semiconductor memory in the RAID controller and on the magnetic media of the RAID disk drives. Though data written to semiconductor memory can be protected using error correction code (ECC) techniques, this will not prevent against inadvertent writes to locations in the memory or reading from incorrect locations. Furthermore, data stored on the disk drives of a RAID system can be stored incorrectly or retrieved incorrectly due to errors in the drives. For example, the drives may have physical problems, data may be stored in the wrong location on the drive, or the data may become corrupted.

The method by which these errors are detected in the system should have minimum impact on the overall system performance. There are several approaches that may be used to protect data from the above-mentioned errors. One method involves the execution of software that checks the integrity of data as it is being stored or retrieved. This method, used to ensure the accuracy of transmitting digital data, is cyclical redundancy checking (CRC). This operation executes concurrently with the transfer of the data. Because this method utilizes a portion of the computing resources for its execution, the overall performance of the system is reduced. This method adds an additional amount of complexity to the software executing in the RAID system.

Another method involves a hardware engine that checks the integrity of data after it has been transferred. Though this method utilizes a small amount of computing resources to initialize and start the hardware engine, system performance is reduced due to the time required to initialize the engine and execute the checking algorithm. If a separate hardware engine is used to perform the CRC function after a transfer to or from system memory is completed, then the next system operation or transfer would have to wait until this CRC operation is completed before executing. This reduces system performance.

The parent patent application provides the addition of a dedicated hardware CRC computation engine to assure the integrity of data transferred between the system memory and storage devices. The CRC computation engine provides CRC calculation "on-the-fly" for the protection of data transferred to and from the system memory without software overhead. The computation of CRC values and optional checking against previously calculated CRC values is selected through the use of an address-mapping scheme. The CRC protection scheme of the parent application requires a small amount of initial software overhead to allocate the data, CRC value, and CRC error regions of the system memory. After the CRC protection scheme is initialized, all CRC operations are transparent to the executing software.

The parent application further provides a separate cache memory for storing recently utilized CRC values. In the parent application, an exemplary preferred embodiment discloses multiple devices coupled through the memory interface each capable of generating transactions involving CRC values. Where all such CRC values are cached together, it remains a problem to rapidly locate a particular cached CRC value entry. Searching through a single hierarchy of the CRC value cache can negatively impact overall system performance.

It is evident from the above discussion that a need exists for an improved method and structure for locating a cached CRC value entry in the CRC value cache memory.

SUMMARY OF THE INVENTION

The present invention solves the above and other problems, thereby advancing the state of the useful arts, by providing structure and methods for reducing overhead processing when locating items in the CRC value cache memory. A first feature provides that multiple (preferably all) CRC values for corresponding multiple sub-blocks of a data block are transferred in a single transaction from system memory to CRC value cache memory. This feature serves to reduce the overhead involved in arbitrating for control of the system memory to retrieve each CRC value individually as requested. A second feature of the invention provides for use of a separate cache table for each source of CRC value access in the storage controller. In particular, an exemplary preferred embodiment of the present invention provides a cache entry table for each of three PCI interface controllers, a cache entry table for a parity assist component of the storage controller and a cache entry table for the DMA controller of the storage controller. Each cache entry table serves to record entries in CRC value cache memory associated with the corresponding device. When a particular device generates a transaction that requires a CRC value, only the cache entry table corresponding to that device is inspected to determine if the entry required is in CRC value cache memory. Cache entry tables corresponding to other devices of the storage controller are not searched for the requested CRC value. This reduction in search processing involved to locate a CRC value cache entry enhances overall system performance.

A first feature of the invention provides that in a system having a system memory containing multiple data blocks each comprising multiple sub-blocks and containing error control values related to each sub-block, a method for caching error control values comprising the steps of: receiving a request to retrieve an identified error control value corresponding to an identified sub-block of an identified data block; determining that the identified error control value is not present in a cache memory; and transferring, in response to the determination that the identified error control value is not present in the cache memory, a set of error control values from the system memory to the cache memory such that the set includes the identified error control value and includes a related error control value.

Another aspect of the invention further provides that the step of transferring comprises the step of: transferring a set of error control values from the system memory to the cache memory such that the set includes the identified error control value and includes multiple related error control values.

Another aspect of the invention further provides that the step of transferring comprises the step of: transferring a set of error control values from the system memory to the cache memory such that the set includes all error control values corresponding to all sub-blocks of the identified data block.

Another aspect of the invention further provides that the error control values are CRC values.

Another aspect of the invention further provides that the step of determining comprises the step of: locating, in a cache table, an entry corresponding to the identified error control value.

Another aspect of the invention further provides that the step of locating includes the step of: determining the presence of the entry using an index number of the identified data block and an index number of the identified sub-block.

Another aspect of the invention further provides that the system includes multiple cache tables such that each cache table includes entries for a corresponding set of devices coupled to the system and such that the devices generate requests to retrieve identified error control values and such that the step of locating includes the step of: selecting the cache table in which to locate the identified error control value in accordance with the identity of a device requesting retrieval of the identified error control value.

A second feature of the invention provides that in a storage controller having system memory containing multiple data blocks each comprising multiple sub-blocks and containing error control values related to each sub-block and having multiple devices that require retrieval of the error control values and having a cache memory for storing copies of selected ones of the error control values, a method for managing the cache memory comprising the steps of: providing multiple cache entry tables such that each cache entry table has at least one entry for identifying an error control value in the cache memory; associating each device of the multiple devices with a cache entry table of the multiple cache entry tables; receiving a request to retrieve an identified error control value from a requesting device of the multiple devices; inspecting only the cache entry table associated with the requesting device to determine whether the identified error control value is present in the cache memory; and transferring, in response to a determination that the identified error control value is not in the cache memory, a set of error control values from the system memory to the cache memory such that the set includes the identified error control value and includes a related error control value.

Another aspect of the invention further provides that the step of transferring comprises the step of: transferring a set of error control values from the system memory to the cache memory such that the set includes the identified error control value and includes multiple related error control values.

Another aspect of the invention further provides that the step of transferring comprises the step of: transferring a set of error control values from the system memory to the cache memory such that the set includes all error control values corresponding to all sub-blocks of the identified data block.

Another aspect of the invention further provides that the error control values are CRC values.

Another aspect of the invention provides that the step of associating comprises the step of: associating each device of the multiple devices with a different cache entry table of the multiple cache entry tables.

Another aspect of the invention provides further provides for the steps of: receiving a request from an updating device of the multiple devices to update an error control value previously transferred to the cache memory; updating the error control value in the cache memory; updating a corresponding entry only in the cache entry table associated with the updating device; and invalidating any corresponding entries in all cache entry tables not associated with the updating device.

Another aspect of the invention further provides for the steps of: receiving a request from an updating device of the multiple devices to update an error control value previously transferred to the cache memory; updating the error control value in the cache memory; and updating a corresponding entry in every cache entry table presently pointing to the error control value.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
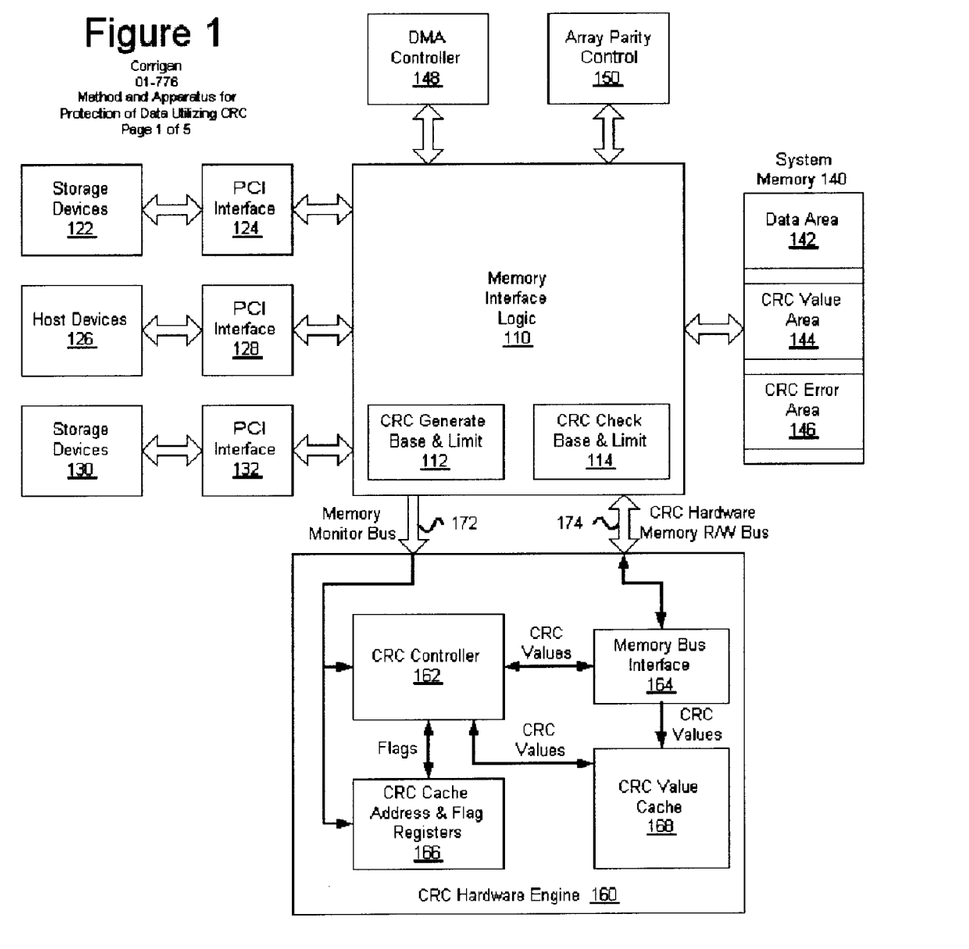
FIG. 1 is a block diagram illustrating a storage system in accordance with a preferred embodiment of the present invention.

With reference now to the figures and in particular with reference to FIG. 1, a block diagram illustrating a storage system is shown in accordance with a preferred embodiment of the present invention. Memory interface logic 110 manages the transfer of data from storage devices 122, 130 and host devices 126 via peripheral component interconnect (PCI) interfaces 124, 128, 132 to system memory 140 and from system memory to the storage devices and host devices. Transfers from devices into system memory are writes and transfers from memory to devices are reads.

For example, host devices 126 may write data to system memory 140 for subsequent storage in one of storage devices 122, 130. As another example, data may be written from one of storage devices 122, 130 to system memory and read from system memory to be transferred to one of host devices 126. Direct memory access (DMA) controller 148 also transfers blocks of data from memory to storage devices. Furthermore, array parity control 150 takes data in blocks of memory, performs calculations, and creates new data. The array parity control is used in striping data across storage devices.

In accordance with a preferred embodiment of the present invention, CRC hardware engine 160 is provided to assure the integrity of data transferred between the system memory and storage devices accessed through PCI buses. The CRC hardware engine provides CRC calculation on the fly for protection of data transferred to or from the system memory without software overhead.

The computation of CRC values and optional checking against previously calculated CRC values is selected through the use of a unique PCI address-mapping scheme. The system memory is accessed in one of three modes: normal, generate, and check. In a CRC generate mode access, the PCI address of a memory transfer falls within the range of the CRC Generate base and limit registers 112. For this transfer, a CRC value is calculated and written to CRC value area 144 of system memory by the CRC hardware engine.

In a CRC check mode access, the PCI address of a memory transfer falls within the range of the CRC check base and limit registers 114. For this transfer, a CRC value is calculated and compared against a previously generated CRC value in the CRC value area of the system memory. If the computed value for the data transfer does not compare against the previously computed value, an error in the data is detected. A transfer of error information to CRC error area 146 of system memory by the CRC hardware engine reports the error. In a normal mode access, the PCI address of a memory transfer does not fall within either the CRC generate or CRC check regions.

CRC hardware engine 160 interfaces to memory interface logic 110 via memory monitor bus 172 and CRC hardware memory read/write bus 174. The memory monitor bus provides a status of the current system memory activity to the CRC hardware engine. The starting address, active port identification (ID), data direction, and data for each transaction to or from the system memory is output from the memory interface logic on the memory monitor bus. Additionally, the port indicates to the CRC hardware engine whether the data transfer falls within the CRC Generate region or the CRC Check region. The CRC hardware memory read/write bus is used by the CRC hardware engine to read previously computed CRC values from system memory and to write newly computed CRC values to system memory. CRC hardware memory read/write bus 174 is also used to write CRC error information to system memory.

When a generate memory transfer begins, CRC controller 162 begins calculation of the CRC value. The CRC controller may use, for example, the CRC-32 polynomial to calculate the remainder. As each 128-bit memory word is presented at the memory monitor bus, the calculation is updated. A CRC remainder is calculated on a block-by-block basis. When the transfer is completed, the CRC hardware engine writes the calculated CRC values to the system memory via memory bus interface 164. CRC values may also be stored in CRC value cache 168.

When a check memory transfer begins, CRC controller 162 reads previously computed CRC values for the memory block being transferred via memory bus interface 164. If CRC cache address and flag registers 166 detect that CRC values are already cached, appropriate flags are presented to CRC controller 162 and the values are read from CRC value cache 168 rather than system memory. The CRC remainder calculation then begins with the first word presented at the memory monitor bus and continues until the end of a block is reached. The computed value is compared with the previously computed value to determine if an error is present. If the CRC controller detects an error, the appropriate error information for the block is written to CRC error area 146 of system memory via memory bus interface 164. The CRC controller may also inform the memory interface logic of the error by, for example, setting an interrupt, generating PCI system errors (PCI SERR), setting status bits, etc.

The parent patent application presents an exemplary preferred embodiment for structuring of information stored in system memory 140 and a simplified overview of the CRC values stored in CRC value cache memory 168. Where the parent application generally referred to caching of individual CRC values as they are utilized, the present invention enhanced overall system performance by caching all CRC values associated with all sub-blocks of a requested block are transferred from system memory 140 to CRC value cache memory 168 upon first reference to any sub-block of the data block. Details of the structure and methods of operation of this feature are provided herein with reference to FIG. 2.

Figure 2:
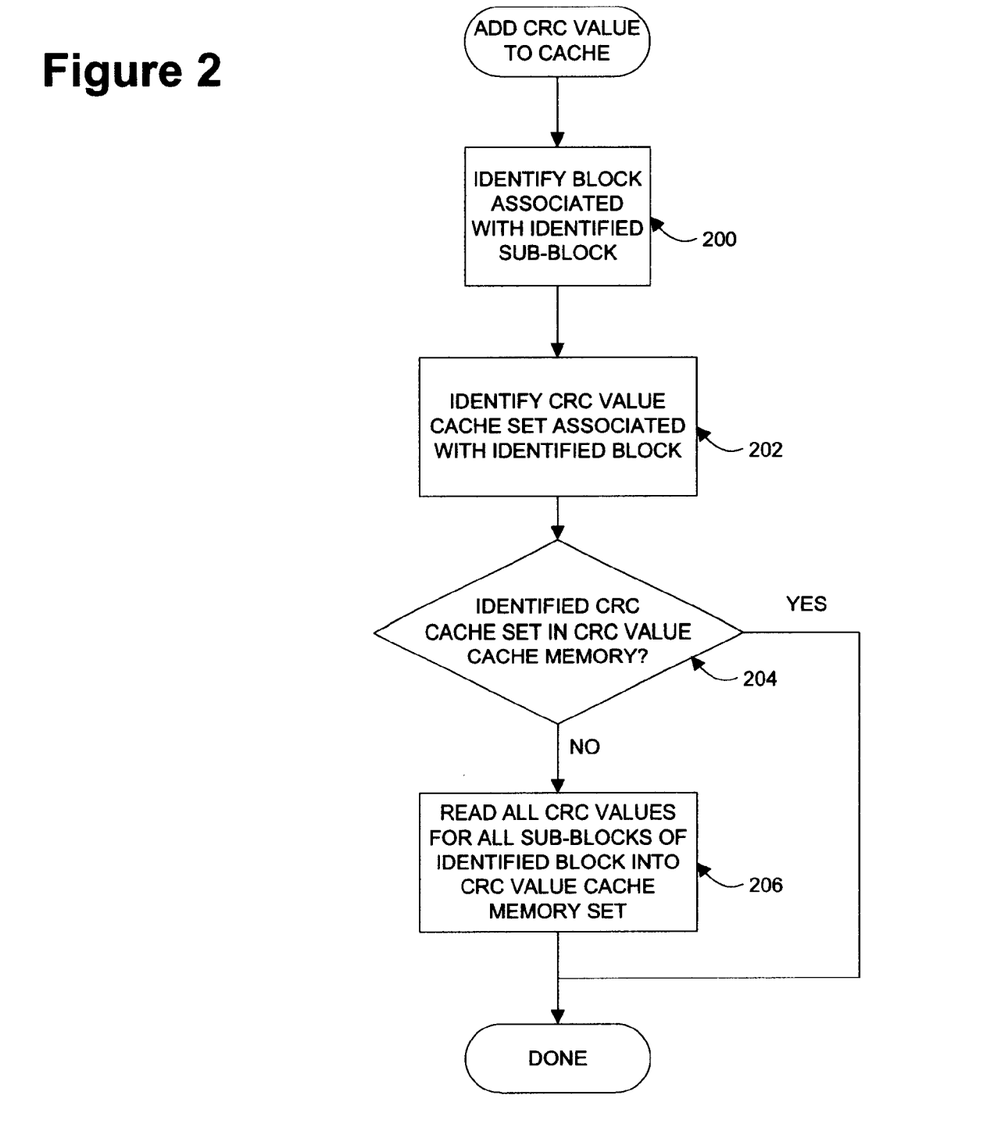
FIG. 2 is a flowchart describing a method of the present invention to add all CRC values corresponding to a subset of sub-blocks of a data block to a CRC value cache memory.

FIG. 2 is a flowchart describing a method of the present invention operable to add a new CRC value to CRC value cache memory 168 of FIG. 1. As noted above, a first feature of the present invention improves overall system performance by reading all CRC values for all sub-blocks of an identified block of user data. The CRC values are read from system buffer memory to CRC value cache memory in one operation rather than individual operations as each sub-block is accessed by a storage controller device. Element 200 is therefore operable to identify the user data block containing the identified sub-block for which the particular CRC value is requested. All CRC values for sub-blocks of the identified data block are preferably stored in an associated set of CRC value entries within the CRC value cache memory.

In a first exemplary preferred embodiment, the associated set of CRC values are stored in contiguous, sequential entries of CRC value cache memory. Those of ordinary skill in the art will readily recognize that the CRC values of the set may be associated by other techniques rather than contiguous, sequential storage locations of the CRC value cache memory. Element 202 is therefore operable to identify the CRC value cache set associated with the identified data block. Element 204 next determines whether the identified CRC value cache set associated with the data block is presently in the CRC value cache memory. If so, no further processing is necessary to retrieve the CRC value from system memory and the desired CRC value for the identified sub-block is returned from the CRC value cache memory to the requesting device.

If the identified CRC value cache set is not presently stored in CRC value cache memory, element 206 is next operable to read all CRC values for all sub-blocks of the identified data block into the identified the CRC value cache set in CRC value cache memory. By reading all CRC values for all sub-blocks of the identified data block from system memory into CRC value cache memory in one operation, overhead processing associated with arbitration for ownership and control of system memory is reduced by comparison to prior techniques. Prior techniques transferred each CRC value from system memory to cache for each sub-block as requested by a device in the storage system. Such reduction in overhead processing associated with system memory arbitration helps improve overall system performance. Requests for subsequent CRC values for other sub-blocks of the same data block need not arbitrate for temporary control over system memory. Rather, subsequent requests for CRC values of sub-blocks in the same data block merely obtain the required CRC value directly from the cache set in CRC value cache memory.

Figure 3:
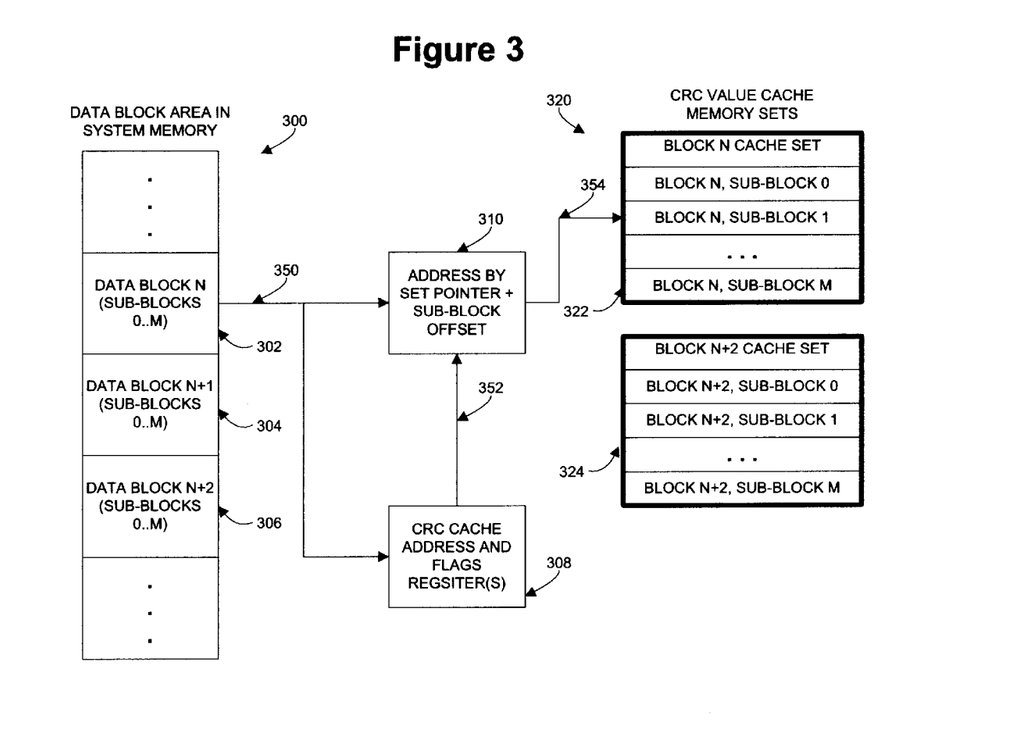
FIG. 3 is a block diagram illustrating a mapping from a data block area in system memory to CRC sets in a CRC value cache memory in accordance with a preferred embodiment of the present invention.

FIG. 3 is a block diagram depicting an exemplary preferred overall organization of data blocks in system memory 300 and associated cache sets 322 and 324 in CRC value cache memory 320. In particular, system memory 300 includes storage allocated to the plurality of data blocks 302 through 306. Each data block 302 through 306 is, in turn, comprised of a plurality of sub-blocks identified by index number 0 through M. The CRC hardware engine (element 160 of FIG. 1) includes logic circuits for identifying block and sub-block addresses sensed by monitoring of CRC transactions addressed to system memory. When a CRC value is requested in a transaction (indicated as path 350), element 310 is operable to generate an appropriate location in CRC value cache memory 320 at which the requested CRC value may be found (if present). In particular, element 310 combines a pointer to the cache set (322 or 324) starting address with an offset for the desired sub-block of the identified data block. The sub-block offset value is derived directly from signals on path 350. The base or starting address of the associated cache set in CRC value cache memory is received from element 308 via path 352. Element 308 determines the base address of the cache set associated with the data block by inspecting the cache address and flags in cache table entries (i.e., cache entry register) associated with CRC value cache memory.

In this exemplary preferred embodiment, the required CRC value is located in the cache table by use of the numbers identifying the block and sub-block for the corresponding CRC value. Other known cache management techniques will be readily apparent to those skilled in the art wherein the CRC value may be located by generation of a unique address or other index into the cache table. In the exemplary preferred embodiment, the data block number and sub-block number provide rapid access to the cache table entry corresponding to the cached CRC value.

As noted above with respect to FIG. 2, the required CRC value will either be located in an entry of the cache table or, if not present in CRC value cache memory, will be read into cache memory from system memory by operation of the method of FIG. 2 above. Element 308 therefore returns the base starting address for the cache set corresponding to the data block containing the identified sub-block. The address so generated by element 310 is applied via path 354 to select the required CRC value from the appropriate cache set in CRC value cache memory. The selected CRC value is then returned to the requesting device for further processing of the associated data block and CRC value. As noted above, CRC values in CRC value cache memory are preferably grouped into sets wherein each set contains all CRC values for all sub-blocks of the particular identified data block. FIG. 3 shows CRC value cache memory 320 containing two cache sets 322 and 324. Set 322 is associated with block N and set 324 is associated with block N+2.

Those skilled in the art will recognize that FIG. 3 is merely representative of one exemplary preferred embodiment of an organization of a CRC value cache memory 320 in accordance with the present invention. In particular, the present invention provides for grouping CRC values for all sub-blocks of an identified data block such that multiple related CRC values associated with an identified data block will be read from system memory whenever a CRC value for any sub-block of the data block is first accessed. Subsequent accesses for other related sub-blocks of the same data block will therefore not incur the processing overhead associated with arbitration and manipulation of the main system buffer memory for obtain CRC values. Rather, only the first CRC value required from a particular identified data block will incur the memory arbitration overhead processing. This reduction in memory arbitration overhead processing helps improve overall system performance of the storage subsystem.

A second feature of the present invention provides for generating and maintaining separate cache tables for each of a plurality of devices associated with the storage controller. Typical storage controllers have a plurality of interface devices to connect the controller to storage devices (disk drives) and to one or more host systems. In addition, other devices within the controller such as DMA controllers and parity assist circuits for RAID storage management may also require access to CRC values in system memory. All such devices benefit from caching of CRC values and the grouping of such CRC values when read from a main system memory to the CRC value cache memory.

As noted above, it is unusual that multiple devices associated with the storage controller would access the same data blocks at substantially the same time. Substantial processing overhead in the storage controller is incurred when all CRC values in the CRC value cache memory need be searched to determine whether a required CRC value is present in the CRC value cache memory. The present invention therefore provides for separate cache tables for each device or for groups of related devices. Each cache table is therefore shorter (fewer entries) since only those CRC values cached for the corresponding device need be entered in that device's cache table. Reducing the size of the cache table by dividing the single table into multiple tables each associated with a corresponding device or devices reduces overhead to search the table for a cache "hit."

Figure 4:
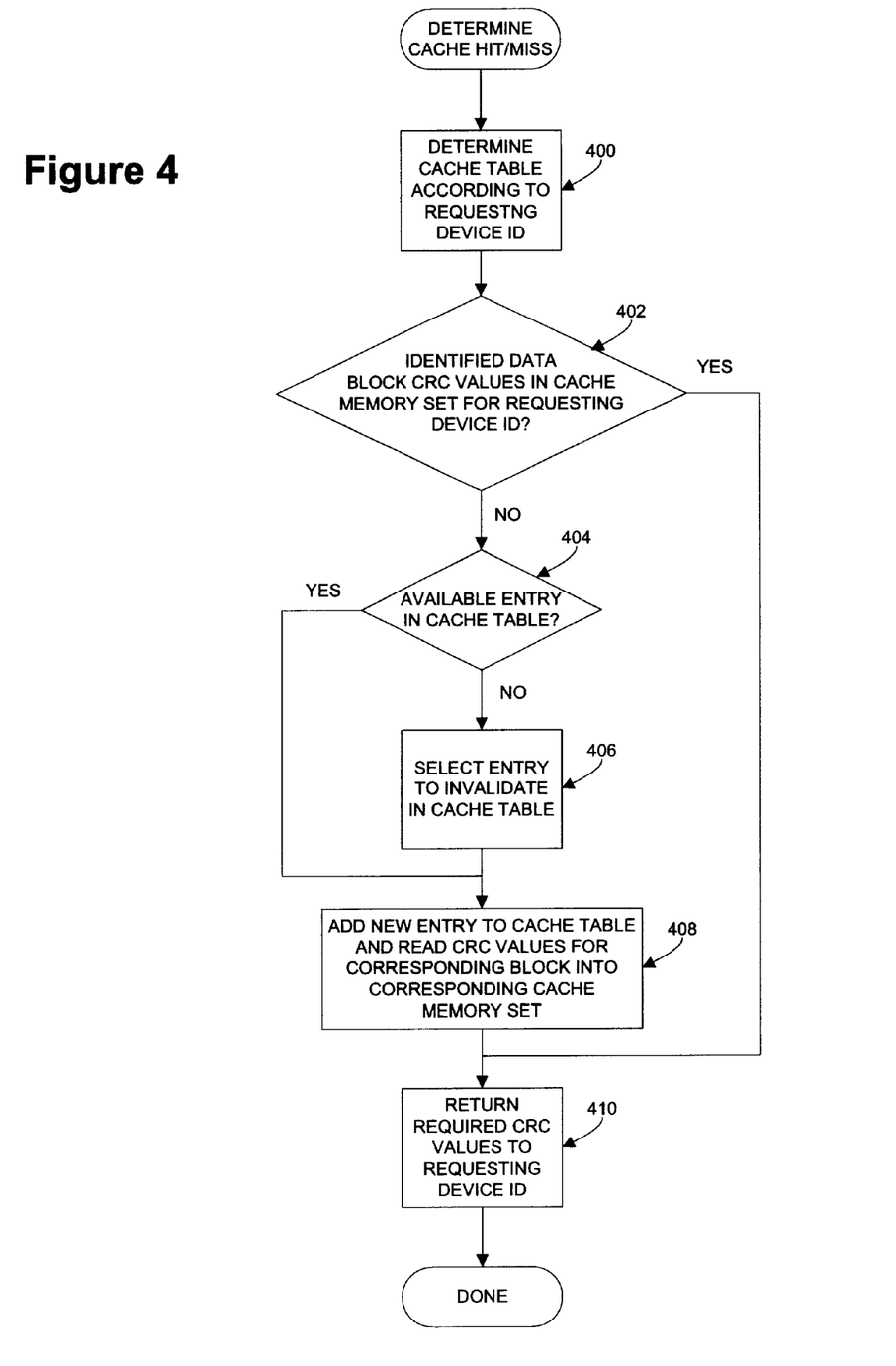
FIG. 4 is a flowchart of a method of the present invention to determine of a requested CRC value is present in the CRC value cache memory and to process a cache hit or miss.

FIG. 4 is a flowchart describing a method in accordance with the present invention whereby it is determined whether a particular cache value is present in the CRC value cache memory. Element 400 is first operable to select an appropriate cache table corresponding to the device requesting the CRC value. Element 402 then determines, utilizing the selected cache table, whether the CRC values for the requested block and sub-block are present in the CRC value cache memory. As noted, only the cache table associated with the requesting device is searched by operation of element 402. Other cache tables associated with other devices in the storage subsystem need not be searched.

If element 402 determines that the required CRC value is already resident in CRC value cache memory, processing continues at element 410 to return the required CRC value to the requesting device. Finding the requested CRC value in CRC value cache memory is usually referred to as a "cache hit." If element 402 determines that the required CRC value is not presently in CRC value cache memory, (typically referred to as a "cache miss", element 404 next determines if there is an available entry in the selected cache table. Flags in the cache table entries are used to identify which entries contain valid information and which are available for use. If element 404 determines that no entry in the selected cache table is presently available for use, element 406 is operable to select an entry to be invalidated and replaced by new cache entry information. Any of several well-known cache replacement algorithms may be utilized including, for example, leased recently used ("LRU") replacement algorithms. Selection of any of several equivalent cache replacement algorithms is a well-known matter of design choice for those skilled in the art.

If element 404 identifies a cache table entry available for use or if element 406 frees a cache table entry for replacement, element 408 then adds the new cache entry information to the cache table and reads CRC values corresponding to the data block from system buffer memory into the corresponding cache set in CRC value cache memory. Element 410 is then operable to return the requested CRC value from CRC value cache memory to the requesting device.

Figure 5:
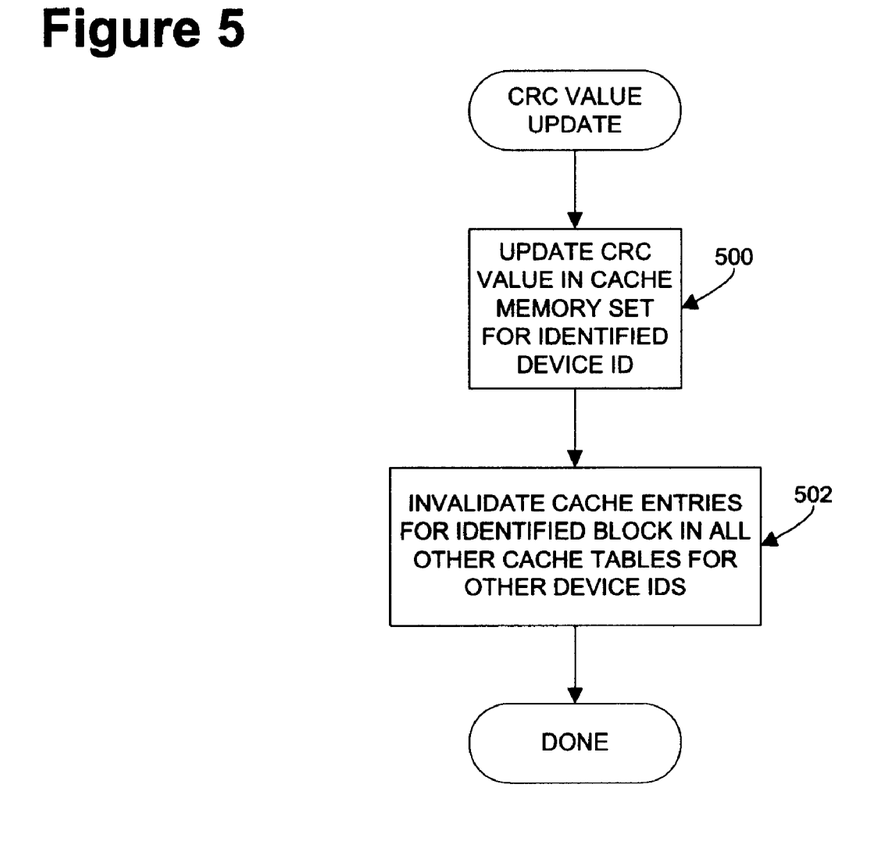
FIG. 5 is a flowchart describing a method of the present invention to invalidate entries in other cache tables for other devices when a CRC value is updated in another cache table associated with another device.

In accordance with one exemplary preferred embodiment of the present invention, each device associated with the storage controller has a corresponding cache table. It is therefore possible that particular CRC values may be stored multiple times in CRC value cache memory—once for each of various devices associated with the storage controller. When a CRC value is updated by virtue of write operation processing within the storage controller, it may be necessary to invalidate entries in multiple cache tables. FIG. 5 is a flowchart describing a method of the present invention whereby such multiple entries are invalidated in response to a sensed transaction updating a CRC value. In particular, element 500 is operable to update the identified CRC value in the cache set in CRC value cache memory for the identified device that updated the CRC value. Element 502 then invalidates corresponding cache entries in other cache tables corresponding to other devices associated with the storage controller. Any cache entry in cache tables for other devices that may include the old CRC value need be invalidated up so that subsequent accesses by other devices to the same CRC value will refresh the CRC value from system memory.

In an alternative embodiment, the updated CRC value in other cache sets corresponding to other devices of the storage controller could be updated rather than invalidated when one copy of the CRC value is updated. This alternative embodiment could incur extra overhead processing to write multiple updated CRC values in cache set memories as compared to simply invalidating entries in the cache tables. It is believed that the additional overhead to update multiple copies in CRC cache sets, though relatively small, would provide no added benefit. The probability that another device of the storage controller would require the same CRC value is small and therefore the added overhead would likely provide not benefit.

Figure 6:
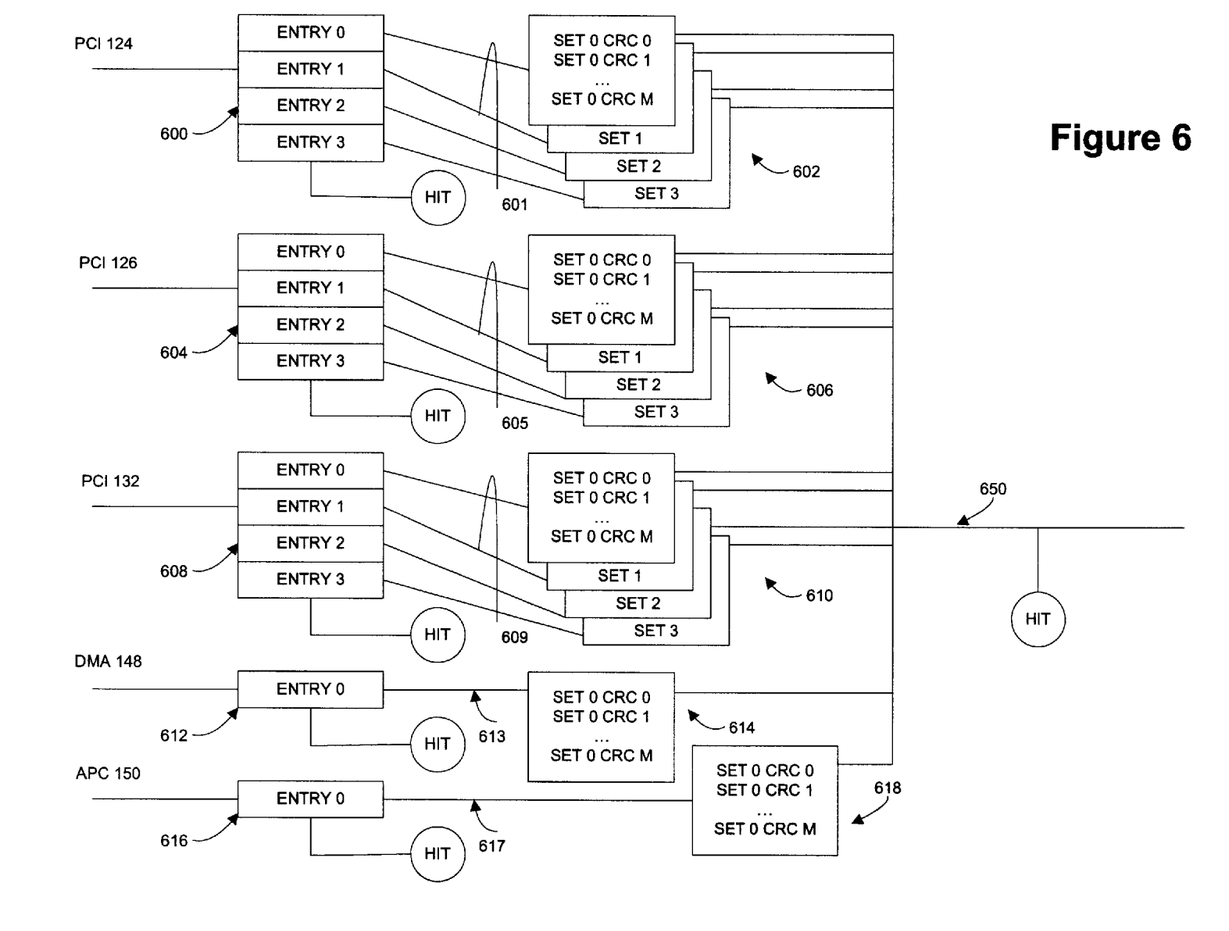
FIG. 6 is a block diagram of an exemplary preferred embodiment of a CRC value cache memory structure in accordance with the present invention.

FIG. 6 is a block diagram of an exemplary preferred embodiment of the present invention having multiple cache tables, each associated with a different device in the storage controller. In particular, cache table 600 is associated with CRC value requests generated by PCI interface 124 (of FIG. 1). When a CRC value request is detected from PCI interface 124, entries in cache table 600 are inspected to determine if CRC values for the corresponding data block are presently in cache memory. If so, a select signal is applied via paths 601 to the appropriate cache set 602 in CRC value cache memory. A signal indicating that the cache hit was detected and the requested CRC value located from the cache set are then applied to path 650 for further processing within the storage controller subsystem. In like manner, cache table 604 selects an appropriate cache set 606 via signals applied to paths 605 in response to a cache value request detected from PCI interface 126. Still further, cache table 608 selects an appropriate cache set 610 via signals applied to paths 609 in response to a cache value request detected from PCI interface 132. Cache table 612 selects cache set 614 via signals applied to path 613 in response to a cache value request detected from DMA controller 148 and cache table 616 selects cache set 618 via signals applied to path 617 in response to a cache value request detected from APC element 150.

As noted above, in accordance with the present invention, CRC value requests generated by PCI interface 124 cause searching of cache entries only in cache table 600. Likewise, CRC value requests generated by PCI interface 126, PCI interface 132, DMA interface 148 and APC element 150 cause searching only of cache tables 604, 608, 612 and 616, respectively. Reducing the overhead processing required to search cache tables by limiting the search to only a subset of cache entries associated with the requesting device improves overall system performance.

Those skilled in the art will recognize that the structure depicted in FIG. 6 is intended merely as representative of one exemplary preferred embodiment of the invention. Numerous equivalent architectures whereby each requesting device associated with the storage controller is associated with a unique cache table will be readily apparent to those skilled in the art.

Further, those skilled in the art will recognize that particular groups of devices associated with the storage controller may share the same cache table. Key to the present invention is the provision of multiple cache tables to subset of the searching for cache table and trees in accordance with the requesting device. One or more requesting devices will cause searching of a first cache table entry while other devices will limit searching for cache entries to a second cache table.

Still further, those skilled in the art will recognize that the particular number of devices depicted in FIG. 6 is merely exemplary of one particular preferred embodiment. Any number of devices associated with the storage controller may be utilized in accordance with the present invention as a well-known matter of design choice. Further, the particular number of cache table entries provided in each cache table is a matter of design choice well-known to those ordinary skill in the art. In the exemplary preferred embodiment of FIG. 6, four cache table entries are likely sufficient for cache tables associated with PCI interfaces 124, 126 and 132. This number preferably corresponds to the number of parallel operations that may be simultaneously active for storage devices or host systems associated with the respective PCI interfaces. By contrast, a single cache table entry may suffice for cache tables associated with the DMA controller 148 and APC element 150. These devices typically do not operate on multiple data blocks simultaneously.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system having an error control value assist device and having a system memory containing multiple data blocks each comprising multiple sub-blocks and containing error control values related to each sub-block, a method for caching error control values comprising the steps of:

receiving, within the error control value assist device, a request to retrieve an identified error control value corresponding to an identified sub-block of an identified data block;

determining, within the error control value assist device, that said identified error control value is not present in a cache memory within said error control value assist device wherein said cache memory stores error control values and is devoid of stored data blocks; and transferring, in response to the determination that said identified error control value is not present in said cache memory, a set of error control values from said system memory to said cache memory wherein said set includes said identified error control value and includes at least one other related error control value wherein the at least one related error control value is related to another sub-block in the same data block as the identified sub-block and wherein the step of transferring is devoid of transferring any sub-blocks into said cache memory.

2. The method of claim 1 wherein the step of transferring comprises the step of:

transferring a set of error control values from said system memory to said cache memory wherein said set includes said identified error control value and includes multiple related error control values.

3. The method of claim 1 wherein the step of transferring comprises the step of:

transferring a set of error control values from said system memory to said cache memory wherein said set includes all error control values corresponding to all sub-blocks of said identified data block.

4. The method of claim 1 wherein said error control values are cyclical redundancy check values.

5. The method of claim 1 wherein the step of determining comprises the step of:

locating, in a cache table, an entry corresponding to said identified error control value.

6. The method of claim 5 wherein the step of locating includes the step of:

determining the presence of said entry using an index number of said identified data block and an index number of said identified sub-block.

7. The method of claim 5 wherein said system includes multiple cache tables wherein each cache table includes entries for a corresponding set of devices coupled to said system and wherein said devices generate requests to retrieve identified error control values and wherein the step of locating includes the step of:

selecting said cache table in which to locate said identified error control value in accordance with the identity of a device requesting retrieval of said identified error control value.

8. In a storage controller having system memory containing multiple data blocks each comprising multiple sub-blocks and containing error control values related to each sub-block and having multiple devices that require retrieval of said error control values and having a cache memory for storing copies of selected ones of said error control values, a method for managing said cache memory comprising the steps of:

providing multiple cache entry tables wherein each cache entry table has at least one entry for identifying an error control value in said cache memory, associating each device of said multiple devices with a cache entry table of said multiple cache entry tables;

receiving a request to retrieve an identified error control value from a requesting device of said multiple devices;

inspecting only the cache entry table associated with said requesting device to determine whether said identified error control value is present in said cache memory; and transferring, in response to a determination that said identified error control value is not in said cache memory, a set of error control values from said system memory to said cache memory wherein said set includes said identified error control value and includes at least one other related error control value wherein the at least one related error control value is related to another sub-block in the same data block as the identified sub-block.

9. The method of claim 8 wherein the step of transferring comprises the step of:

transferring a set of error control values from said system memory to said cache memory wherein said set includes said identified error control value and includes multiple related error control values.

10. The method of claim 8 wherein the step of transferring comprises the step of: transferring a set of error control values from said system memory to said cache memory wherein said set includes all error control values corresponding to all sub-blocks of said identified data block.

11. The method of claim 8 wherein said error control values are cyclical redundancy check values.

12. The method of claim 8 wherein the step of associating comprises the step of: associating each device of said multiple devices with a different cache entry table of said multiple cache entry tables.

13. The method of claim 8 further comprising the steps of:

receiving a request from an updating device of said multiple devices to update an error control value previously transferred to said cache memory;

updating said error control value in said cache memory;

updating a corresponding entry only in the cache entry table associated with said updating device; and invalidating any corresponding entries in all cache entry tables not associated with said updating device.

14. The method of claim 8 further comprising the steps of:

receiving a request from an updating device of said multiple devices to update an error control value previously transferred to said cache memory;

updating said error control value in said cache memory; and updating a corresponding entry in every cache entry table presently pointing to said error control value.

15. A storage controller comprising:

system memory containing multiple data blocks each comprising multiple sub-blocks and containing error control values related to each sub-block;

a cache memory for storing copies of selected ones of said error control values;

multiple devices coupled to said storage controller and generating requests for retrieval of said error control values;

a cache controller coupled to said multiple devices and coupled to said system memory and coupled to said cache memory wherein said cache controller includes:

multiple cache entry tables wherein each cache entry table has at least one entry for identifying an error control value in said cache memory;

means for associating each device of said multiple devices with a cache entry table of said multiple cache entry tables;

means for receiving a request to retrieve an identified error control value from a requesting device of said multiple devices;

means for inspecting only the cache entry table associated with said requesting device to determine whether said identified error control value is present in said cache memory; and means for transferring, in response to a determination that said identified error control value is not in said cache memory, a set of error control values from said system memory to said cache memory wherein said set includes said identified error control value and includes at least one other related error control value wherein the at least one related error control value is related to another sub-block in the same data block as the identified sub-block.

16. The system of claim 15 wherein the means for transferring further comprises:

means for transferring a set of error control values from said system memory to said cache memory wherein said set includes said identified error control value and includes multiple related error control values.

17. The system of claim 15 wherein the means for transferring further comprises;

means for transferring a set of error control values from said system memory to said cache memory wherein said set includes all error control values corresponding to all sub-blocks of said identified data block.

18. The system of claim 15 wherein said error control values are cyclical redundancy check values.

19. The system of claim 15 wherein the means for associating further comprises:

means for associating each device of said multiple devices with a different cache entry table of said multiple cache entry tables.

20. The system of claim 15 farther comprising:

means for receiving a request from an updating device of said multiple devices to update an error control value previously transferred to said cache memory;

means, responsive to receipt of said request, for updating said error control value in said cache memory;

means, responsive to receipt of said request, for updating a corresponding entry only in the cache entry table associated with said updating device; and means, responsive to receipt of said request, for invalidating any corresponding entries in all cache entry tables not associated with said updating device.

21. The system of claim 15 further comprising:

means for receiving a request from an updating device of said multiple devices to update an error control value previously transferred to said cache memory;

means, responsive to receipt of said request, for updating said error control value in said cache memory; and means, responsive to receipt of said request, for updating a corresponding entry in every cache entry table presently pointing to said error control value.

* * * * *